(No Model.)
H. ABBOTT.
EYEGLASSES OR SPECTACLES.
No. 579,121. Patented Mar. 23, 1897.
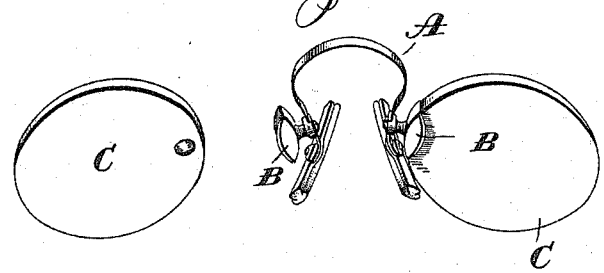
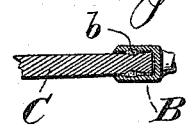
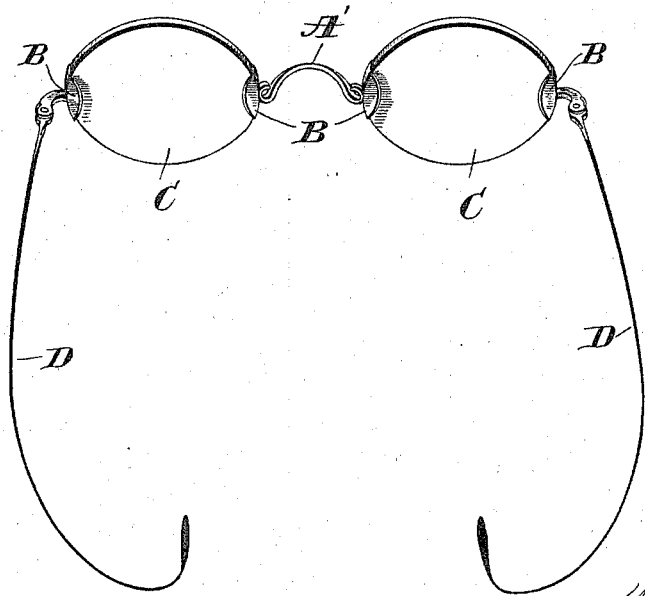
Witnesses:
Jas. E. Hutchinson.
Chas. J. Williamson.
Inventor
Henry Abbott
by Prindle and Russell
his Attorneys
THE NORRIS PETERS CO., PHOTO-LITHO., WASHINGTON, D. C.

UNITED STATES PATENT OFFICE.

HENRY ABBOTT, OF NEW YORK, N. Y., ASSIGNOR, BY MESNE ASSIGNMENTS, TO LAURA FRANCIS ABBOTT, OF EAST ORANGE, NEW JERSEY.

EYEGLASSES OR SPECTACLES.

SPECIFICATION forming part of Letters Patent No. 579,121, dated March 23, 1897.

Application filed July 5, 1893. Serial No. 479,625. (No model.)

*To all whom it may concern:*

Be it known that I, HENRY ABBOTT, of New York, in the county of New York, and in the State of New York, have invented certain new and useful Improvements in Eyeglasses or Spectacles; and I do hereby declare that the following is a full, clear, and exact description thereof, reference being had to the accompanying drawings, in which—

Figure 1 is a perspective view of a pair of eyeglasses constructed in accordance with my invention, one lens being shown separated from the nose-piece; Fig. 2, a like view of a pair of spectacles embodying my invention; Fig. 3, a detail view in section.

Letters of like name and kind refer to like parts in the several figures.

My invention relates to what are known as "frameless" eyeglasses and spectacles, and has for its object the attachment together of the lenses and their uniting and supporting parts without the drilling of holes in the lenses that is necessary where the screw or rivet form of fastening is employed; and to this end said invention consists in the means employed for attaching the lenses of eyeglasses and spectacles to their uniting and supporting parts, substantially as and for the purpose hereinafter specified.

In the construction of the frameless type of eyeglasses and spectacles the drilling of holes through the lenses for the attachment thereto by screws of the nose-piece in the case of both eyeglasses and spectacles, and the temple-bows in the latter case, is open to the serious objection that in drilling a great many glasses are broken. In addition to this the operation is expensive and adds to the cost of production, while a further objection arises from the increased liability to breakage in use, due to the presence of the holes. These objections I avoid by the employment of fastening means which dispense with the necessity of forming holes through the lenses and the use of screws or like attaching devices.

In constructing a pair of eyeglasses I provide at or near each end of the spring nose-piece A a clip in the form of a small slotted or grooved metal block or piece B, that is adapted to receive and overlap both sides of the lens C at its inner edge and extend some distance around the latter. A suitable uniting medium $b$ is employed to firmly unite each clip and a lens, and for the purpose of adding to the security of the union I form well-defined pockets or cavities in the adjacent surfaces of both the glass and clip. Said pockets or cavities can be made by any suitable means.

The uniting medium I preferably use is an amalgam similar to that used by dentists, which, being applied in a plastic form, hardens very quickly, making a perfect and very durable joint between the glass and metal, and at a cost very slight in comparison with that of the old fastening means.

In making spectacles the nose-piece A' is provided with clips for attachment to the inner ends of the lenses C C, and a clip is provided for the outer end of each lens, to which a temple-bow D of ordinary construction is hinged or pivoted.

If it is desired to provide for the attachment of a cord or chain to the eyeglasses, this can be done by employing a clip having formed upon or attached to it a suitable eye or ring, to which the cord or chain can be secured.

In practice the cup form of clip shown has been found important and necessary. Both on account of the necessity of applying considerable force to the metallic or amalgam filling to securely fasten the clip to the glass and also to withstand the strains of ordinary use it is requisite that the sides of the clip be quite wide where they connect with the lens-edge-engaging portion, so as to have all needed stiffness. Preferably the outline of such side pieces is a simple curve.

Having thus described my invention, what I claim is—

1. As a means for securing together the lenses and supporting parts of eyeglasses and spectacles, a clip overlapping the lens edge and a uniting substance between the clip and lens side, the clip and lens each having a well-defined cavity or pocket into which said substance enters to firmly interlock the parts, substantially as and for the purpose specified.

2. As a means for securing together the lenses and supporting parts of eyeglasses and spectacles, a clip overlapping the lens edge and a metallic filling between the sides of the clip and the lens sides, each side of the clip, and the adjacent side of the lens having a well-defined cavity or pocket to receive and
5 contain a portion of said filling, whereby the parts are firmly interlocked, substantially as and for the purpose specified.

In testimony that I claim the foregoing I have hereunto set my hand this 20th day of June, 1893.

HENRY ABBOTT.

Witnesses:
 JACOB MARKS,
 WALTER B. DE CAMP.